United States Patent

Foster-Pegg

[15] 3,663,172
[45] May 16, 1972

[54] CARBON BLACK PRODUCTION PROCESS

[72] Inventor: Richard Wigmore Foster-Pegg, Warren, Pa.

[73] Assignee: Cities Service Company, New York, N.Y.

[22] Filed: June 29, 1970

[21] Appl. No.: 50,533

[52] U.S. Cl. ..........................23/209.4, 23/209.6, 23/259.5
[51] Int. Cl. .....................................C09c 1/48, C10b 47/00
[58] Field of Search ..........................23/209.4, 209.6, 259.5

[56] References Cited

UNITED STATES PATENTS

| | | | |
|---|---|---|---|
| 3,362,789 | 1/1968 | Hardy et al. | 23/209.6 |
| 3,463,612 | 8/1969 | Whitsel, Jr. | 23/209.6 |

Primary Examiner—Oscar R. Vertiz
Assistant Examiner—Hoke S. Miller
Attorney—J. Richard Geaman

[57] ABSTRACT

A hot aerosol of carbon black is discharged from a furnace into a turbocharger, thus driving the latter. The compressor stage of the turbocharger supplies air to the furnace. The economics of the process are improved because the production rate of carbon black is greatly increased while the energy requirement for supplying air to the furnace is obtained from heat rejected from the process in place of purchased electric power.

13 Claims, 1 Drawing Figure

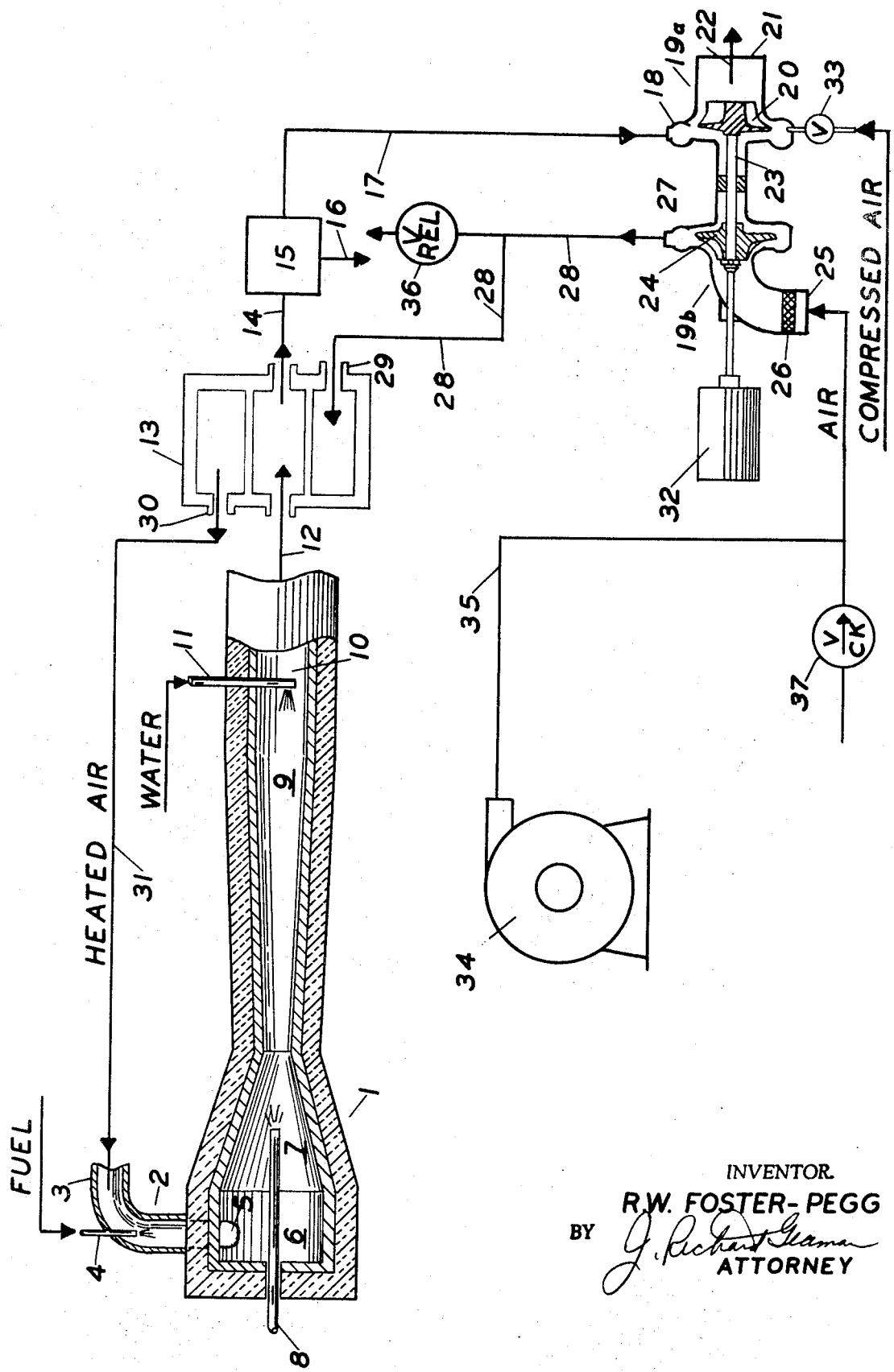

CARBON BLACK PRODUCTION PROCESS

BACKGROUND OF THE INVENTION

Most carbon blacks are now manufactured by furnace processes wherein a feedstock hydrocarbon, e.g. a residue oil, is thermally decomposed within a reaction zone of the furnace by absorption of heat from hot combustion gases within which the feedstock is dispersed, thereby producing an aerosol of carbon black suspended in the hot combustion gases and the gaseous products which result from thermal decomposition of the feedstock. The resultant aerosol is then cooled, usually at least partially with water, prior to passage into a collection system for recovery of the carbon black.

The hot combustion gases within which the feedstock hydrocarbon is thermally decomposed are produced by burning a mixture of air and fuel, e.g. natural gas. Since the air must be supplied to a fuel mixer under moderate pressure and at a relatively high volume rate, it has been conventional practice to supply the air stream to the mixer by means of an electrically driven blower or compressor. On commercial production units the power requirement for such blowers is commonly within the range of about 110–185 Kw.

For thermal decomposition of the feedstock hydrocarbon to form carbon black, reaction temperatures within the furnace usually exceed about 2,300° F, and are quite often within the rage of about 2,500°–3,000° F. The resultant carbon black aerosol is therefore characterized by a high energy content which, by and large, is wasted rather than recovered.

SUMMARY OF THE INVENTION

Therefore, one of the principal objects of the present invention is to recover and utilize at least a part of the energy content of the hot aerosol that is produced in a furnace black manufacturing process. Other objects and advantages of the invention will become apparent from the following description thereof and the appended claims.

In the present invention, the hot carbon black aerosol which has been produced in a furnace is passed into the expander stage of a turbocharger, thus driving the latter. The compressor stage of the turbocharger is utilized for compressing a stream of air which is supplied for mixture with fuel that is burned to produce the hot combustion gases within which the feedstock hydrocarbon is thermally decomposed. By means of this invention, an electrically driven air blower is not required for supplying air for the combustion mixture, and the power requirement for the blower is therefore obviated. More significantly, sufficient horsepower can be developed by means of a relatively simple and inexpensive turbocharger to significantly increase the pressure and rate at which the air is supplied for mixture with the fuel, thereby greatly increasing the production rate potential of the furnace.

The invention is not limited to one particular types of carbon black furnace or furnace process, but may be adapted to any type wherein a feedstock hydrocarbon is dispersed and thermally decomposed within hot combustion gases which are produced by burning air with a fuel. It will be understood that the term "air" as used herein is intended to mean, oxygen-enriched air, or other free-oxygen containing gases. It will also be understood that the term "fuel" as used herein is intended to mean the commonly employed fluid fuels, e.g. natural gas and fuel oils, and that in some cases part of the carbon black feedstock is burned to produce the hot combustion gases, and whereby no separate fuel supply necessary. Furthermore, it will be appreciated that although the mixer which is employed for mixing air and fuel is normally an integral part of the furnace, mixing of the fuel with air can be accomplished separately of the furnace when it is preferable and practical to do so.

The term "turbocharger" as used herein has reference to a combination of a turbine with a compressor and such as is used, for instance, for the supercharging of an internal combustion engine. The turbocharger thus comprises an expander stage, wherein hot exhaust gases are jetted against a turbine wheel, and a compressor stage into which air is drawn and compressed by means of the expander stage, i.e. the turbine. In the usual case the turbine wheel and the compressor wheel are mounted on a common shaft, and the expander and compressor stages are separated by means of a partition wall and seal. Water cooling and thermal insulation are employed to protect heat sensitive components such as bearings and seals from overheating. Currently, turbochargers can be operated with exhaust gases having a temperature at the inlet of the expander stage of up to about 1,300° F. Detailed information on turbocharger components which can be adapted for use with the present invention are available from pp. 792–832 of Diesel and Gas Turbine Catalog, Vol. 33, 1968 Edition, published by Diesel and Gas Turbine Progress, 11225 W. Blue Mound Road, Milwaukee, Wis. 53213. It will be understood, however, that the compressor can be a centrifugal, axial, rotary, or some other type which is satisfactory for the purpose. Furthermore, modified components from gas or steam turbines, for instance, could be employed for assembly of a suitable turbine-compressor combination. Both the turbine and the compressor can consist of a single stage or multiple stages, and more than one compressor can be driven by the turbine, e.g. an auxiliary compressor.

When practicing the invention, the temperature of the carbon black aerosol should be reduced, if necessary, to protect against overheating of the turbocharger. Upon entering the expander stage of the turbocharger, the temperature of the aerosol should not exceed the design limit of the machine; and the aerosol can, to advantage, be at least partially quenched with water to achieve the desired temperature, since the presence of substantial amounts of water vapor improves the performance of the turbocharger by increasing the mass flow of the aerosol. It will be appreciated that it is known to quench carbon black aerosols with water and this step does not, therefore, represent a departure from ordinary practice. However, other means for cooling can be employed where preferable and practical, e.g. radiation and conduction to the atmosphere, but it should be pointed out that when the temperature of the aerosol entering the expander stage is below about 1,000° F, compression and expansion powers would not balance without the additional mass flow provided by a water quench. To advantage, therefore, the aerosol can be cooled with water to a temperature within the range of about 1,600° F to about 950° F while effecting a $\Delta T$ of at least about 700° F, and more advantageously a $\Delta T$ within the range of about 1,200°–1,800° F.

It has been determined, most surprisingly, that the carbon black aerosol can be continuously fed to and through the expander stage of turbocharger without causing excessive erosion or clogging of the turbine wheel or the expander chamber with carbon black. However, should there be any danger of passage of coke or refractory grit into the expander stage as would result in excessive wear or damage thereto, the aerosol should be subjected to a grit separation step before being passed into the turbocharger, e.g. by means of an expansion chamber or a cyclone separator.

In one advantageous embodiment of the invention, a heat exchanger may be placed in the line between the furnace and the turbocharger, the hot aerosol being conveyed through one side of the exchanger while the compressed air stream that is supplied for mixing with fuel is passed through the other side. Accordingly, heat can be exchanged from the aerosol to the air stream, thereby heating the latter and reducing the amount of fuel required to achieve satisfactory reaction temperatures within the furnace. To advantage, the aerosol is cooled to a temperature within the range of about 1,800° F. to about 1,200° F. before entry into the exchanger and can be cooled therein to a temperature within the range of about 1,300° F. to about 950° F before passage to the expander stage of the turbocharger. In most instances, therefore, it is possible to achieve cooling of the aerosol to a temperature which is within the safety limits of both the exchanger and the turbocharger by quenching the aerosol upstream of both units. Suitable heat exchangers which can be employed with the invention are well known to those skilled in the art and need not be described in detail.

With the present invention, carbon black is separated from the aerosol and collected in accordance with well known practices, i.e. after discharge from the expander stage of the turbocharger the aerosol can be subjected to further cooling, if necessary, and can then be passed into a cyclone and/or a bag filter for separation and recovery of the carbon black.

The furnace-turbocharger system can be started up by a number of methods. Air flow through the system can be initiated either by blowing air into the furnace with an auxiliary blower or by cranking the turbocharger mechanically or by means of a jet of compressed air which impinges on the turbine wheel. With air flow initiated, the fuel can be turned on, the mixture lit, and the water quenched started. As fuel flow and temperatures increase, the turbocharger progressively takes over propulsion of the air stream and the system soon becomes self-sustaining. When conditions are stable, introduction of the feedstock hydrocarbon into the furnace can be started.

It has been determined that when air at about atmospheric pressure is fed into the inlet of the compressor stage, the turbocharger can be placed into energy balance when the air is compressed to about 2 atmospheres, and in which case the efficiency of the compressor stage is at least about 75 percent while the efficiency of the expander is at least about 78 percent. In such a case, the carbon black furnace operates at a maximum internal pressure of about 15 psig. At this pressure the flow of fluids to the furnace can be doubled, with respect to operation at atmospheric pressure, without altering the velocity or the residence time of material flow through the furnace. Accordingly, the carbon black production rate of the furnace can be greatly increased.

It will be understood that the present invention also applies to cases wherein the expander and the compressor stages of the turbocharger may not be in exact power balance. When, for instance, the aerosol entering the expander has more than enough temperature for a balance, sufficient extra power may be available from the turbocharger shaft to also drive a generator. In other cases, however, it may be necessary to supply power to the shaft from, for instance, an electric motor or a supplementary turbine to achieve sufficient output from the compressor.

BRIEF DESCRIPTION OF THE DRAWING

The drawing is a somewhat diagrammatical flowsheet, partly in section of one embodiment of the present invention.

DESCRIPTION OF A PREFERRED EMBODIMENT

With reference to the drawing, a carbon black furnace is represented, generally, at 1. The furnace is provided with an air-fuel mixer, generally represented at 2. The mixer consists of a conduit 3 for containing a stream of air and a fuel jet 4 whereby a fluid fuel is injected into conduit 3 for mixture with the air conveyed therein. The mixture of air and fuel is introduced through a tangential inlet 5 into a cylindrical combustion chamber 6 of the furnace and the mixture is burned within chamber 6 to produce hot combustion gases. The resultant spiral of hot gases produced in chamber 6 then move into a convergent frustoconical section 7 of the furnace and forms a vortex therein. The feedstock hydrocarbon, or "oil," is introduced into the vortex of hot combustion gases by means of an injector 8. The feedstock becomes dispersed within the gases of the vortex to form a reacting mixture which passes into a divergent frustoconical section 9 of the furnace wherein thermal decomposition of the feedstock is substantially completed to produce a carbon black aerosol which is conveyed into a breeching 10. With the breeching, or even upstream thereof, the carbon black aerosol is quenched with water supplied through conduit 11, having an atomizer tip fitted to the distal end thereof for producing finely atomized spray of water.

The quenched aerosol is then passed through line 12 into the tube side of a tube-and-shell heat exchanger, generally represented at 13, wherein the aerosol is further cooled prior to passage through line 14 to grit separator represented at 15. Separated grit is removed from the separator through line 16. The cleaned aerosol is thereafter conveyed through line 17 into the inlet 18 of the expander stage of a turbocharger, generally represented at 19a. The aerosol from line 17 impinges a turbine wheel 20 and rapidly rotates the same. Thereafter, the aerosol discharges from the expander stage of the turbocharger through an outlet 21 to line 22 which interconnects with a carbon black collection system, not shown. The turbine wheel 20 is affixed to a rotable shaft 23 having a compressor wheel 24 mounted on the other end thereof. The compressor wheel is thus driven by the turbine wheel, so that a stream of air is drawn into the compressor stage of the turbocharger, generally represented at 19b. The air enters the compressor through an inlet 25 which is provided with a filter 26. Air is thus compressed and is discharged from the outlet 27 of the compressor stage and is led through line 28 the inlet 29 of the shell side of the heat exchanger 13.

As previously indicated, the hot carbon black aerosol passes through the tube side of the heat exchanger 13 by means of lines 12 and 14. Air which enters the exchanger through inlet 29 is thus heated by passage over the tubes and discharges from the exchanger through an outlet 30. The heated air stream then passes into conduit 3 of the air-fuel mixer 2 through line 31.

In operation, the hot carbon black aerosol from the furnace 1 is fed to the turbine wheel 20 by means of lines 12, 14, and 17, thus rotating the compressor wheel 24 and supplying a compressed air stream to the furnace through lines 28 and 31. Accordingly, the air supply to the furnace is self-sustaining.

The turbocharger may be set into rotation by means of an electrical starter represented at 32, or by means of a compressed air stream directed onto the turbine wheel 20 by means of a conduit and valve assembly 33. Another alternative method of starting involves the use of an auxiliary blower 34 whereby air is initially fed to the system via line 35 until the turbocharger is able to sustain the air supply, at which time the auxillary blower is shut down. The blower 34 is shunted by means of a check-valve 37 where air is drawn directly into the inlet 25 from the atmosphere after the blower is no longer needed.

The compressor outlet pressure is regulated by a relief valve represented at 36, thus controlling the speed of the turbocharger, i.e. as a set pressure is exceeded valve 36 automatically opens and vents air from the compressor outlet, dropping the pressure and increasing the power absorbed by the compressor, thus reducing the speed and delivery pressure thereof.

Either an electric generator or a motor, also represented at 32, can be used for recovering or supplying power from the turbocharger when the e expander and compressor are out of power balance. By means of a generator, electricity can be produced and utilized within the system when extra power is available from the expander. When additional power is needed to operate the compressor, it can be supplied by means of a motor.

EXAMPLE

Using an apparatus arrangement substantially as shown in drawing, air was fed to the mixer of the furnace at the rate of 475,000 SCFH while natural gas was fed to the mixer at the rate of 25,550 SCFH. The mixture was burned in the combustion chamber of the furnace, the resulting hot combustion gases forming a vortex in the convergent section. The feedstock hydrocarbon, a petroleum cranking residue, was injected into the furnace at the rate of 670 GPH and was dispersed in the hot gases of the vortex within the convergent section. The resulting reaction mixture was then discharged through the 7 inch outlet of the convergent section into the downstream divergent section of the furnace wherein thermal decomposition of the feedstock hydrocarbon was substantially completed while maintaining reaction temperatures within the range of 2,500°–3,000° F. The resulting carbon black aerosol was then quenched to a temperature of 1,200°F by injecting a spray of water into the breeching at the rate of 20 GPM.

The quenched aerosol was discharged from the breeching into the tube side of a tube-and-shell heat exchanger while the compressed air stream from the turbocharger was passed through the shell side of the exchanger before being passed to the air-gas mixer of the furnace. Accordingly, the temperature of the aerosol as it discharged from the exchanger was 849° F, and the temperature of the air stream which discharged therefrom was 1,044° F.

After leaving the heat exchanger, the aerosol was then passed into an expansion chamber for removal of grit and was thereafter introduced into the expander stage of a turbocharger which was thereby driven at a speed of about 20,000 RPM. The air stream which was fed to the furnace was drawn into the compressor stage from the atmosphere at 80° F and was discharged therefrom at 14.5 psig and 237° F. Suction pressure at the inlet of the compressor stage was 405 inches of water. Inlet conditions at the expander stage were 6.5 psig and 849° F while discharge conditions at the expander outlet were 1.0 psig and 776° F. Under these conditions, 520 HP were recovered from the hot carbon black aerosol by means of the turbocharger and were thus used to supply air to the furnace. The carbon black producing rate of the furnace was 64,200 lb./day of ISAF black, this being recovered by passing the aerosol from the expander stage of the turbocharger to a carbon black collection system.

While the invention has been described with reference to particular conditions, materials, flow rates, apparatus and the like, it will be understood that various other changes and modifications can be made which are within the spirit and scope of the invention as set forth in the appended claims.

Therefore, what is claimed is:

1. In a furnace carbon black manufacturing process where a mixture of air and fuel is burned to produce hot combustion gases and a feedstock is dispersed within said hot gases in the furnace and is thermally decomposed therein to form carbon black by absorption of heat from said gases, thus producing a heated aerosol of carbon black suspended in the hot gases produced by combustion of said mixture and by thermal decomposition of said feedstock hydrocarbon, the method for supplying the air for said mixture using a turbogenerator having an expander stage and a compressor stage which comprises:

a. passing said aerosol from said furnace into the expander stage of said turbocharger and therein converting heat energy of said aerosol into mechanical energy and thus driving the compressor stage of said turbocharger, b. compressing a stream of air in said compressor stage of said turbocharger and supplying the resultant compressed air stream for mixture with the fuel that is burned to produce said hot combustion gases; and c. recovering the carbon black from said aerosol after the discharge thereof from said turbocharger.

2. The process of claim 1 wherein the aerosol is subjected to a grit separation step before being passed into said turbocharger.

3. The process of claim 1 wherein the aerosol is quenched with water to effect a substantial reduction in temperature prior to the entry thereof into said turbocharger.

4. The process of claim 3 wherein the aerosol is quenched with water to a temperature of within the range of about 1800°–950° F.

5. The process of claim 3 wherein the quenched aerosol is passed through one side of a heat exchanger prior to introduction of said aerosol into said turbocharger while the compressed air stream is being passed through the other side of said heat exchanger, the temperature of the aerosol being reduced and the temperature of the aerosol being reduced and the temperature of the air being increased by passage through said exchanger.

6. The process of claim 5 wherein the temperature of the aerosol entering said exchanger is within the range of about 1,800° F to about 950° F and within the range of about 1,300° F to about 800° F upon leaving the exchanger.

7. The process of claim 3 wherein the aerosol is quenched with water to effect a Δ T of at least about 700° F.

8. The process of claim 7 wherein the Δ T is within the range of about 1,200°–1,800° F.

9. The process of claim 1 wherein the hot aerosol is introduced into said expander stage at temperature of not in excess of about 1,300° F.

10. The process of claim 1 wherein mechanical energy available from said turbine is in excess of that used in driving said compressor to supply air to said furnace and the resultant excess energy is otherwise utilized.

11. The process of claim 10 wherein the excess mechanical energy utilized to drive a generator.

12. The process of claim 1 wherein the mechanical energy required to drive said compressor is in excess of that available from said turbine, and extra power is supplied to said compressor from another source.

3. The process of claim 1 wherein the extra mechanical energy is supplied to said compressor from an electric motor.

* * * * *